US011225016B2

(12) United States Patent
Barnes

(10) Patent No.: US 11,225,016 B2
(45) Date of Patent: Jan. 18, 2022

(54) ADDITIVE MANUFACTURING LAYERS

(71) Applicant: HEWLETT-PACKARD DEVELOPMENT COMPANY, L.P., Spring, TX (US)

(72) Inventor: Arthur H Barnes, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 19 days.

(21) Appl. No.: 16/608,887

(22) PCT Filed: Oct. 20, 2017

(86) PCT No.: PCT/US2017/057575
§ 371 (c)(1),
(2) Date: Oct. 28, 2019

(87) PCT Pub. No.: WO2019/078882
PCT Pub. Date: Apr. 25, 2019

(65) Prior Publication Data
US 2020/0238608 A1    Jul. 30, 2020

(51) Int. Cl.
*B29C 64/188* (2017.01)
*B29C 64/232* (2017.01)
(Continued)

(52) U.S. Cl.
CPC .......... *B29C 64/188* (2017.08); *B29C 64/153* (2017.08); *B29C 64/194* (2017.08); *B29C 64/218* (2017.08); *B29C 64/232* (2017.08); *B29C 64/245* (2017.08); *B29C 64/295* (2017.08); *B33Y 10/00* (2014.12); *B33Y 30/00* (2014.12)

(58) Field of Classification Search
CPC .......................... B29C 64/153; B29C 64/165
See application file for complete search history.

(56) References Cited

U.S. PATENT DOCUMENTS 5,252,264 A * 10/1993 Forderhase ............ B33Y 40/00
264/497
5,730,925 A *  3/1998 Mattes .................. B29C 64/153
264/497

(Continued)

FOREIGN PATENT DOCUMENTS

WO    WO-2007134688 A1    11/2007
WO    WO-2015170330 A1    11/2015
WO    WO-2016068899 A1     5/2016

OTHER PUBLICATIONS

Shanjani, Y. et al., Material Spreading and Compaction in Powder-based Solid Freeform Fabrication Methods: Mathematical Modeling, Sep. 25, 2008.

*Primary Examiner* — Atul P. Khare
(74) *Attorney, Agent, or Firm* — HP Inc. Patent Department

(57) ABSTRACT

Some examples include a method of operating an additive manufacturing machine including spreading a build material in a first direction across a build surface to form a layer, the layer having a thickness, decreasing a distance between a spread mechanism and the build surface, and translating the spread mechanism in a second direction opposite the first direction over the build surface to reduce the thickness of the layer.

11 Claims, 6 Drawing Sheets

(51) Int. Cl.
  *B29C 64/245* (2017.01)
  *B29C 64/295* (2017.01)
  *B29C 64/218* (2017.01)
  *B29C 64/153* (2017.01)
  *B29C 64/194* (2017.01)
  *B33Y 10/00* (2015.01)
  *B33Y 30/00* (2015.01)

(56) References Cited

U.S. PATENT DOCUMENTS

| | | | | |
|---|---|---|---|---|
| 6,767,499 B1 * | 7/2004 | Hory | ........................ | B33Y 10/00 264/497 |
| 7,789,037 B2 * | 9/2010 | Teulet | ................ | B23K 35/0255 118/64 |
| 7,850,885 B2 * | 12/2010 | Philippi | ................ | B33Y 40/00 264/113 |
| 7,879,393 B2 * | 2/2011 | Ederer | ..................... | B29C 41/12 427/203 |
| 9,061,465 B2 * | 6/2015 | Hagiwara | ............... | B29C 35/08 |
| 9,421,715 B2 | 8/2016 | Hartmann et al. | | |
| 9,919,475 B2 * | 3/2018 | Sasaki | ..................... | B22F 10/10 |
| 10,792,861 B2 * | 10/2020 | Philippi | ................ | B23K 26/354 |
| 11,007,718 B2 * | 5/2021 | Williams | ............... | B29C 64/153 |
| 2001/0045678 A1 | 11/2001 | Kubo et al. | | |
| 2001/0050448 A1 * | 12/2001 | Kubo | ..................... | B29C 64/165 264/308 |
| 2005/0023719 A1 * | 2/2005 | Nielsen | ................... | B29C 64/40 264/162 |
| 2005/0104241 A1 | 5/2005 | Kritchman et al. | | |
| 2005/0225007 A1 * | 10/2005 | Lai | ........................ | B29C 64/165 264/308 |
| 2005/0263934 A1 * | 12/2005 | Chung | .................. | B29C 64/153 264/113 |
| 2012/0164322 A1 * | 6/2012 | Teulet | ................... | B05C 1/0817 427/180 |
| 2014/0363585 A1 * | 12/2014 | Pialot | ................. | B23K 35/0244 427/551 |
| 2015/0306818 A1 * | 10/2015 | Chen | ..................... | B29C 64/153 425/112 |
| 2016/0067929 A1 * | 3/2016 | Park | ........................ | B29C 64/35 425/162 |
| 2016/0271886 A1 * | 9/2016 | Shi | ........................ | B33Y 40/00 |
| 2016/0368054 A1 | 12/2016 | Ng et al. | | |
| 2017/0120332 A1 | 5/2017 | DeMuth et al. | | |

* cited by examiner

ADDITIVE MANUFACTURING LAYERS

BACKGROUND

Additive manufacturing machines produce three dimensional (3D) objects by building up layers of material. Some additive manufacturing machines are commonly referred to as "3D printers". 3D printers and other additive manufacturing machines make it possible to convert a CAD (computer aided design) model or other digital representation of an object into the physical object. The model data may be processed into layers, each defining that part of a layer or layers of build material to be formed into the object.

DETAILED DESCRIPTION

Figure 1A:
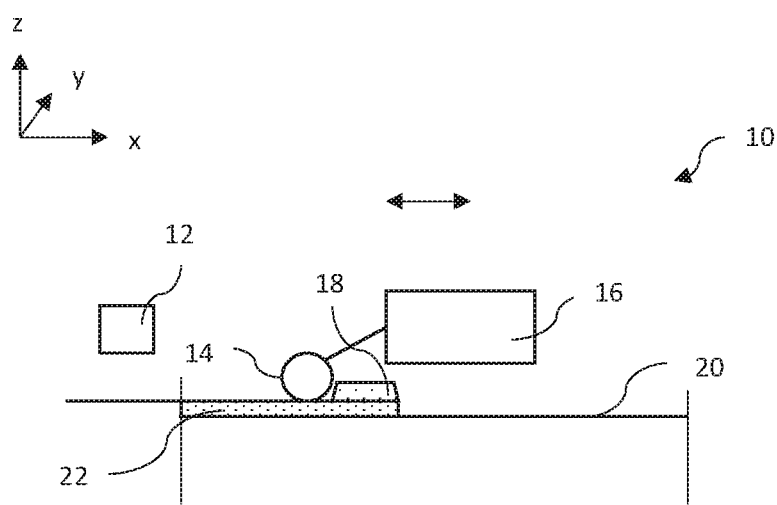
FIG. 1A is a schematic cross-sectional side view of an example additive manufacturing system in accordance with aspects of the present disclosure.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

The descriptions and examples provided herein can be applied to various additive manufacturing technologies, environments, and materials to form a three dimensional (3D) object based on data of a 3D object model. Various technologies can differ in the way layers are deposited and fused, or otherwise solidified, to create a build object as well as in the materials that are employed in each process.

In an example additive manufacturing process, a build material and a fusing agent can be deposited and heated in layers to form a build object. An example additive manufacturing technology can dispense a build material and spread the build material onto a build surface to form a layer of build material. The build material can be dispensed onto a dose plate adjacent the build surface. The build surface can be a surface of a platen or underlying build layers of build material on a platen within a build chamber, for example. The example additive manufacturing technology can dispense a suitable fusing agent in a desired pattern onto the layer of build material and then expose the build material and the fusing agent to an energy source, such as a thermal energy source. Sintering, or full thermal fusing, can be employed to fuse small grains of build material, e.g., powders. Sintering typically involves heating the build material to melt and fuse the particles together to form a solid object.

In some additive manufacturing technologies, the layer of build material may be formed using a roller or a recoater. A printhead may be used to dispense a printing agent, such as a fusing agent, on a formed layer of build material. The recoater and printhead may be carried on a moving carriage system. The moving carriage system may comprise, in different examples, either a single carriage or multiple carriages. A dispensing assembly can be employed to dispense and spread build material to form a layer of build material. The dispensing assembly may also include a printhead to selectively dispense fusing agent, or another kind of printing agent. A thermal energy source can also be mounted on the carriage system and moved across a build surface. The build material can be a powder-based type of build material and the fusing agent can be an energy absorbing liquid that can be applied to the build material, for example. The build material can include plastic, ceramic, and metal powders, and powder-like material, for example. In some examples, the build material can be formed from, or may include, short fibers that may, for example, have been cut into short lengths from long strands or threads of material. Other types of build materials can also be acceptable. The energy source can generate heat that is absorbed by fusing energy absorbing components of the fusing agent to sinter, melt, fuse, or otherwise coalesce the patterned build material. In some examples, the energy source can apply a heating energy, suitable to heat the build material to a pre-fusing temperature, and a fusing energy, suitable to fuse the build material where the fusing agent has been applied. Thermal, infrared, or ultraviolet energy can be used, for example, to heat and fuse the material. The patterned build material can solidify and form an object layer, or a cross-section, of a desired build object. The process is repeated layer by layer to complete the 3D build object.

In one example, using selective laser sintering (SLS) technology, a layer of build material is formed and a thermal heat source, such as a laser, is used to selectively heat and fuse portions of the layer of the build material in a build pattern. With SLS technology the patterned build material can melt and solidify to form an object layer, or a cross-section, of a desired build object. The process is repeated layer by layer to complete the three dimensional (3D) build object.

In another example, a layer of build material is formed and a liquid binding agent (e.g., a chemical binding agent) is selectively deposited to bind the build material together in a select build pattern. A printhead can be used to dispense the binding agent on a formed layer of build material. The patterned build material can solidify to form an object layer, or a cross-section, of a desired build object. In one example, an energy source can be used to dry, or cure, the binding agent.

In general, build layers are patterned and bonded or fused together to form 3D build object as desired by the customer. In some examples, the 3D build object can be positioned and oriented for build in a build area of a build chamber as desired by the customer. In other examples, the position and orientation of the 3D build object in the build area is determined by a printer operator or an automatic object packing tool. The position and geometry of the build object within build chamber can effect thermal and physical properties of build material. For example, a top surface of a build part may have a higher temperature than the newly formed layers of build material, since it may have been previously heated to fusing temperature. Heat may be transferred from build parts under fabrication into a newly formed layer of build material as the build material is spread over a previously formed and processed layer of build material. Heat transfer from the hot build part to the new layer of build material can effect spread density and the heat transfer from build parts into the build material downstream of the spread and may also affect the thermal history of the downstream build parts. As discussed herein, the terms downstream and upstream indicate a direction that a pass of the build process is moving. For example, if a build process is moving left to right across the build surface, a first build part positioned on the left side of the build surface would be upstream to a second build part that is positioned to the right side of the first build part, or downstream of the first build part. For example, in a pass of the build process that occurs across the build surface from the left to right, the build process on the right side (i.e., downstream) would occur at a later stage, or follows, that of the left side (i.e., upstream).

It is desirable to precisely control the thermal and mechanical stresses applied to a build object during the build process across various additive manufacturing technologies, environments, and materials. During the solidification process, non-uniform temperature distribution or unbalanced thermal or mechanical stress can cause warpage or otherwise affect the dimensional accuracy of the build object. For example, if the build layer, or a portion thereof, becomes too hot, the patterned fusing agent perimeter may "bleed" into the surrounding build material and result in incorrect geometry, dimensions and appearance. Additionally, increased heat can undesirably affect the subsequent layer of build material with uncontrolled fusing. Thermal and mechanical stress variations can cause undesirable build variations. Many factors can contribute to part surface temperature including build material mass variation, build material temperature variation, build material melt enthalpy, contamination of the fusing system, convective air currents in the chamber, as well as other factors. Factors that can contribute to mechanical stresses include shear stress induced by the translating and rotating roller and the static powder in the build chamber during the spreading process. As such, controlling and minimizing thermal and mechanical stresses during the build process is highly desirable in obtaining a desired structural integrity and dimensional accuracy for the build object.

A build material dose (e.g., the quantity of build material) deposited to form a build material layer can be slightly more or less than the dose quantity of build material useful to form the layer completely and with full part coverage of the buildable area due to surface variances of the build surface, including variations formed in previously formed and bonded or fused layers. For example, bonded or fused build material in previously formed layers can compress, or consolidate, leaving the height, or thickness, of the bonded or fused portions (e.g., build part) recessed below the height of non-bonded or non-fused portions forming cavities or recess over a build part due to thermal energy retained in the build part being greater than thermal energy retained in surrounding build material. Deposition and spreading of additional build material over the differing temperature build parts and build material can affect mechanical stresses applied by a spread mechanism across the surface of the build parts. Build material can absorb heat as it is spread over a part resulting in increased downstream temperature of the build material. Recesses formed in a first, upstream, build part, can leave less build material available downstream of the build part including for a second, downstream, build part. The reduced build material downstream can reduce the density of the build material filling the build part cavity and compaction forces employed by a spread mechanism or other mechanism. As the build material dose decreases, there is less build material available to fill the next part cavity which can result in reduced densification of the next downstream part and cause reduced or weakened material properties in the downstream build part. Additional build material may be useful in spreading over the build surface to fill part recesses or cavities.

FIG. 1A is a schematic side view of an example additive manufacturing machine 10 in accordance with aspects of the present disclosure. Additive manufacturing system 10 includes a dispensing assembly 12, a spread mechanism 14, and a thermal energy source 16. Dispensing assembly 12 can include a build material dispenser to dispense a build material 18. In some examples, dispensing assembly 12 can also include a printhead to selectively dispense a fusing agent, or other printing agent. Spread mechanism 14 can spread build material into a layer 22.

Spread mechanism 14 can be moveable over build surface 20 to spread build material 18 into a layer having a thickness $T_1$. In one example, spread mechanism 14 can include a cylindrical roller that is rotatable, clockwise or counterclockwise, about a central longitudinal axis (extending in a y-axial direction) as spread mechanism 14 is translated across build surface 20 in an x-axial direction. Spread mechanism 14 can additionally or alternatively include a wiper, blade, screed, or other suitable mechanism for spreading and moving build material 18 across and/or from build surface 20. In some examples, spread mechanism 14 can be moved vertically repositionable, in the z-axial direction, to raise or lower spread mechanism 14 with respect to build surface 20. Vertical adjustments to the position of spread mechanism 14 relative to the build surface 20 can provide control for changes in build material layer thickness during each pass, as discussed further below.

Figure 1B:
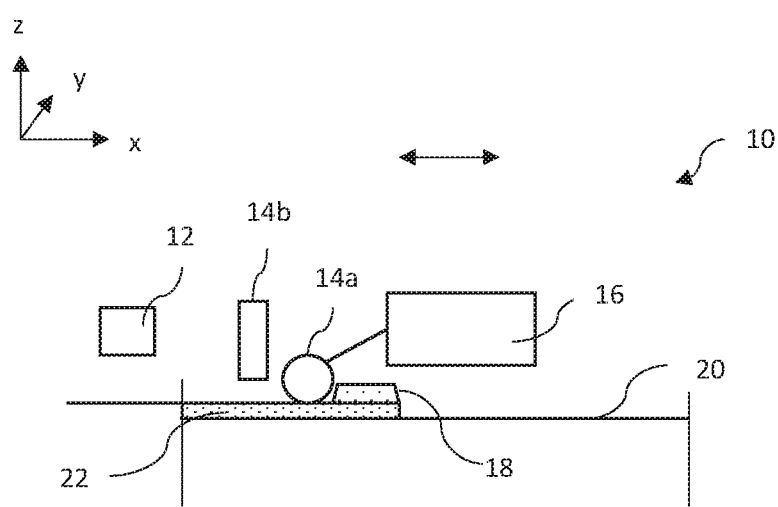
FIG. 1B is a schematic cross-sectional side view of an example additive manufacturing system in accordance with aspects of the present disclosure.

With additional reference to FIG. 1B, in some examples, spread mechanism 14 can include a first spreader 14a and a second spreader 14b. First and second spreaders 14a, 14b can each be any of a roller, wiper, blade, screed, or other suitable mechanism for spreading and moving build material across and/or from build surface. First and second spreaders 14a, 14b can be carried on a moving carriage system including either a single movable carriage or multiple movable carriages across the build surface 20. In one example, first spreader 14a is vertically adjustable independent second spreader 14b. In one example, first spreader 14a can be employed to spread build material 18 into a layer having a first defined thickness and second spreader 14b can be employed to a second, defined reduced, thickness, as discussed further below.

Thermal energy source 16 can heat and bond or fuse build material 18 on which a binding or fusing agent has been deposited to form a build object layer. Thermal energy source 16 can be employed to heat (e.g., warm) build material 18 to a pre-bonding or pre-fusing temperature. Thermal energy source 16 can also be employed to heat and bond or fuse build material 18 into build object layers forming the build object. In some examples, thermal energy source 16 can include a first thermal lamp of a color temperature suitable to heat build material without causing fusing of build material and a second thermal lamp of a higher color temperature to cause fusing of build material on which fusing agent has been printed, for example, in a select pattern corresponding to a cross-section of a layer of an object being generated. In some examples, thermal energy source 16 can be employed to fuse build material 18 on which fusing agent has been printed. In some examples, thermal energy source 16 can include a first energy source to warm build material 18 and a second energy source to fuse build material 18. In one example, energy source 16 used to fuse build material 18 is a laser.

Figure 2A:
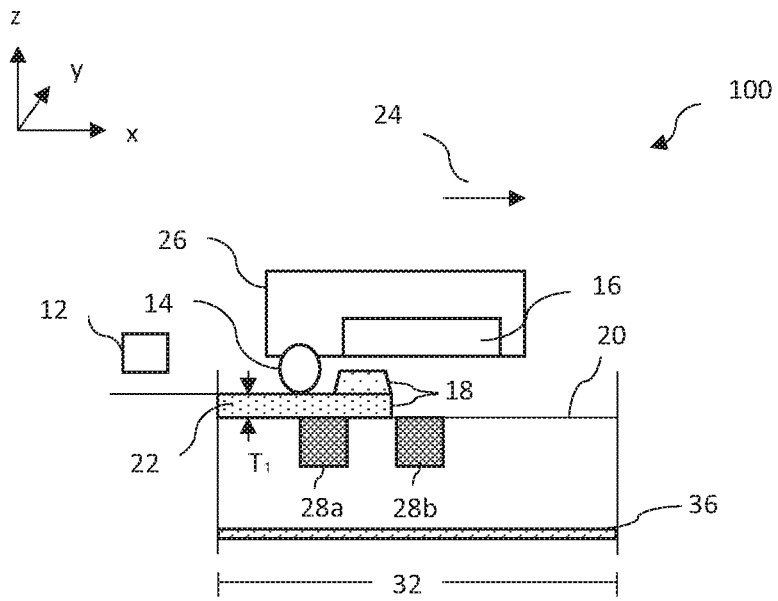
FIGS. 2A-2C are side schematic views illustrating an example four pass spreading and fusing cycle of an additive manufacturing machine in accordance with aspects of the present disclosure.
Figure 2B:
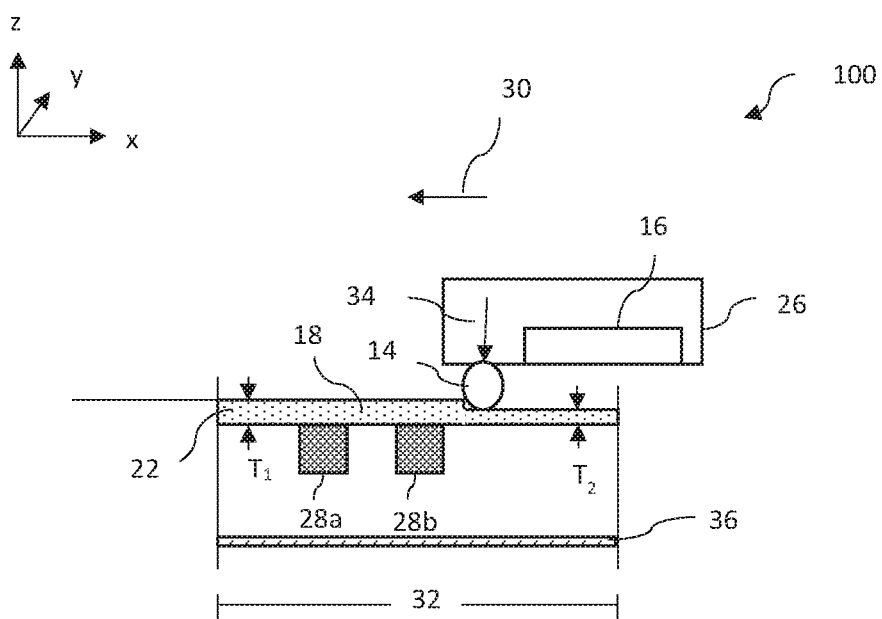
Figure 2C:
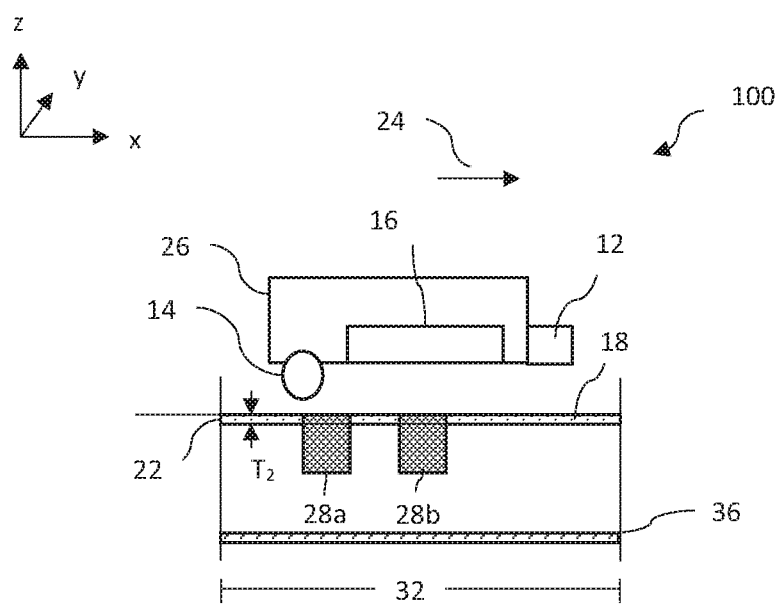

FIGS. 2A-2C are side schematic views illustrating an example four pass spreading and fusing cycle of an additive manufacturing machine 100 in accordance with aspects of the present disclosure. During a first pass, as illustrated in FIG. 2A, a layer of build material 18 is formed on the build surface 20 as dispensing assembly 12 and spread mechanism 14 are translated across build surface 20 formed within a build zone 32 of a build chamber in a first direction, indicated by arrow 24. It is understood that spread mechanism 14 can include a single spreader (see, e.g., FIG. 1A) or first and second spreader 14a, 14b (see, e.g., FIG. 1B). Spread mechanism 14 can be mounted to a carriage system 26 that is moveable, or translatable, across build surface 20. Build material 18 can be deposited by dispensing assembly 12 and then spread mechanism 14 can be employed to distribute, or spread, build material 18 to form a layer 22 having a first thickness $T_1$ on build surface 20 as spread mechanism is moved over build surface 20 in the first pass in first direction 24. In this example, in translating in first direction 24, from left to right, a left side of build surface is upstream and a right side of build surface is downstream.

Thermal energy source 16 can warm the underlying build surface 20 downstream of spread mechanism 14 and incoming, or newly spread, build material 18. In one example, thermal energy source 16 can also be mounted to carriage system 26 that is translatable across build surface 20. Incoming, or new, build material 18 can be at a first material temperature when dispensed from dispensing assembly 12. Build surface 20 warmed by thermal energy source 16 can be a higher temperature than the first material temperature of incoming build material 18. As build material 18 is spread across build surface 20, heat energy can be transferred into incoming build material. For example, a build object 28 formed of selectively bonded or fused layers of build material can have increased surface temperatures from thermal energy absorbed during bonding or fusing. In one example, as new build material 18 is spread across build surface 20 formed at least partially of previously fused build object parts 28a, 28b, heat energy from build object part 28a, 28b can be transferred into incoming build material 18. Transversely, the lower temperature of incoming build material can cool the surface temperature of build object parts 28a, 28b. As build material 18 is spread across build surface 20, from left to right in first direction 24 as illustrated in FIG. 2A, for example, heat energy from build part 28a is transferred into build material 18 as build material 18 is spread over build part 28a and heat energy from build part 28a is translated across build surface 20 as build material 18 is spread in first direction 24. Heat energy transferred from build part 28a can be translated, or spread, in build material 18 over build surface 20 and build part 28b that is downstream from build part 28a. The heat energy of build material 18, including increases transferred from build part(s) 28 is transferred into subsequently spread, downstream, build material 18 and build parts.

During a second pass, as illustrated in FIG. 2B, layer 22 formed of build material 18 is reduced from first defined thickness $T_1$ deposited on build surface 20 during the first pass, to a second, defined reduced, thickness $T_2$ as spread mechanism 14 is translated across build surface 20 of build chamber in a second direction 30, opposite first direction 24 to remove build material. Build material can be removed from a top portion of the layer (i.e., the portion of build material between $T_1$ and $T_2$) to reduce layer 22 thickness $T_1$ to thickness $T_2$ by translating spread mechanism 14 across build surface 20 after decreasing a distance between spread mechanism 14 and build surface 20. For example, spread mechanism 14 can be vertically repositioned, or lowered, as indicated by arrow 34, relative to build surface 20 in order to reduce thickness $T_1$ to defined reduced thickness $T_2$. In some examples, spread mechanism 14 can be movably coupled to carriage for vertical adjustment relative to layer 22 and build surface 20. In some examples, spread mechanism 14 is lowered from a first positioned (illustrated in FIG. 2A) to a second position (illustrated in FIG. 2B) to reduce layer 22 thickness from thickness $T_1$ to reduced thickness $T_2$ as spread mechanism 14 is translated in second direction 30. In an alternate example, a platen 36 forming a base of build surface 20 can be vertically adjustable to raise or lower build surface 20 and layer 22 (not shown). For example, platen 36 can be raised to position layer 22 on build surface 20 a suitable vertical distance to reduce first defined thickness $T_1$ deposited on build surface 20 to a second, defined reduced, thickness $T_2$ as spread mechanism 14 is translated across build surface 20 in second direction 30 (e.g., from right to left). In some examples, platen 36 can be in a lowered position in a first spreading pass for build material 18 be deposited and spread in a first thickness $T_1$, and then raised for a second spreading pass in order that first thickness $T_1$ be decreased by spread mechanism 14 passing back over layer 22 to reduced thickness $T_2$.

In some examples, defined reduced thickness $T_2$ is approximately half thickness $T_1$. For example, thickness $T_1$ can be 160 microns to 200 microns and reduced thickness $T_2$ can be 80 microns to 100 microns. Other appropriate thicknesses $T_1$ and $T_2$ and reductions to thickness $T_1$ may also acceptable. Build material 18 removed from layer 22 that is excess of the defined reduced thickness $T_2$ can be removed from build chamber by a perimeter vacuum, for example, or other suitable means. The process can be repeated until the build object is complete. In one example, the thickness and the defined reduced thickness are the same in every build layer.

Mechanical shear stress can be applied onto build parts 28a, 28b and build material 18 by spread mechanism 14 as spread mechanism 14 is translated across build surface 20 to spread, or evenly distribute, build material 18 to form layer 22. Mechanical shear stress applied by spread mechanism 14 is transferred through layer 22 with the greatest stress imparted by spread mechanism 14 onto the top of layer 22 (directly contacted by the spread mechanism 14) and decreasing through the thickness of layer 22 toward the bottom of layer 22 with the bottom of layer 22 (farthest from spread mechanism 14) effect the least shear stress from spread mechanism 14. A greater thickness of layer 22 provides a greater thickness of material to distribute and dissipate the shear stress forces, with less force being transmitted through layer 22 to build surface 20 and build parts (e.g., 28a, 28b) beneath layer 22.

Forming layer 22 with an increased initial thickness $T_1$ during the first pass can reduce shear stress and lower a drag force applied by spread mechanism 14 transferred onto build parts 28a, 28b by dispersing stress forces throughout thickness $T_1$ of layer 22. In particular, upper regions and surfaces of build parts 28a, 28b can still maintain an increased heat energy from fusing and heat energy can be transferred downstream by spread mechanism 14. The vertical distance between build parts 28a, 28b and spread mechanism 14 provided by thickness $T_1$ of layer 22 can result in reduced stress and drag force transferred to build parts 28a, 28b, reducing build part shifting and spreading related defects. Thickness $T_1$ of layer 22 can also provide improved heat energy disbursement with additional build material 18. Translating spread mechanism 14 over, and through, build material 18 during the second pass in second direction 30 to reduce layer 22 thickness $T_1$ to reduced thickness $T_2$ imparts a reduced shear stress onto upper portions and top surfaces of build parts 28a, 28b as build material 18 forming thickness $T_1$ of layer 22 can absorb and more evenly disperse heat energy from build parts 28a, 28b. In another example, with reference to FIG. 1B, first spreader 14a spreads build material to form layer 22 with initial thickness $T_1$ during the first pass and second spreader 14b follows at a lower position than (e.g., reduced distance from, or closer to, build surface) first spreader 14a to reduce layer 22 to reduced thickness $T_2$.

FIG. 2C illustrates a third pass, a fusing pass. In the third pass, dispenser assembly 12 moves back over build zone 32, from left to right in first direction 24, to dispense fusing agents onto build material 18, followed by thermal energy source 16 to expose patterned build material 18 to fusing energy and form an additional build object layer of build parts 28a, 28b in layer 22. If an additional fuse pass is to be employed, a fourth pass (not shown), or second fuse pass is initiated. In the fourth pass, thermal energy source 16 moves back over build zone 32, from right to left in second direction 30, and thermal energy source exposes patterned build material to additional fusing energy.

Figure 3:
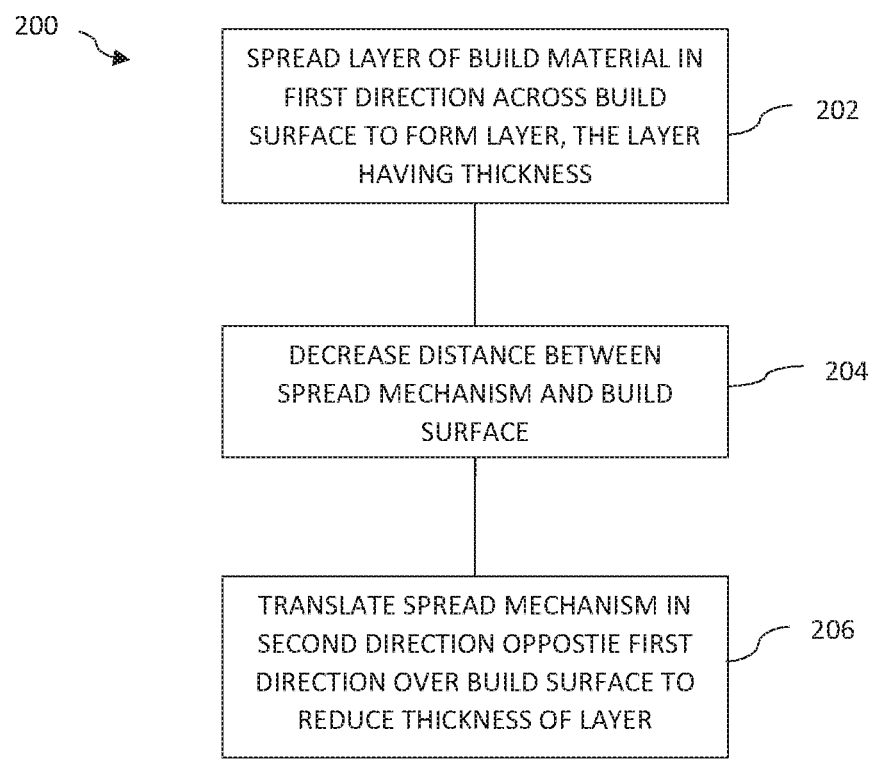
FIG. 3 is a flow chart of an example method of operating an additive manufacturing machine in accordance with aspects of the present disclosure.

FIG. 3 is a flow chart of an example method 200 of operating an additive manufacturing machine in accordance with aspects of the present disclosure. At 202, a build material is spread in a first direction across a build surface to form a layer. The layer has a first thickness. At 204, a distance between a spread mechanism and the build surface is decreased. At 206, the spread mechanism is translated in a second direction opposite the first direction over the build surface to reduce the thickness of the layer to a second thickness. In one example, spreading the build material onto the build surface can include positioning the spread mechanism at a second distance above the build surface, the second distance greater than the first distance, and translating the spread mechanism in the first direction.

Figure 4:
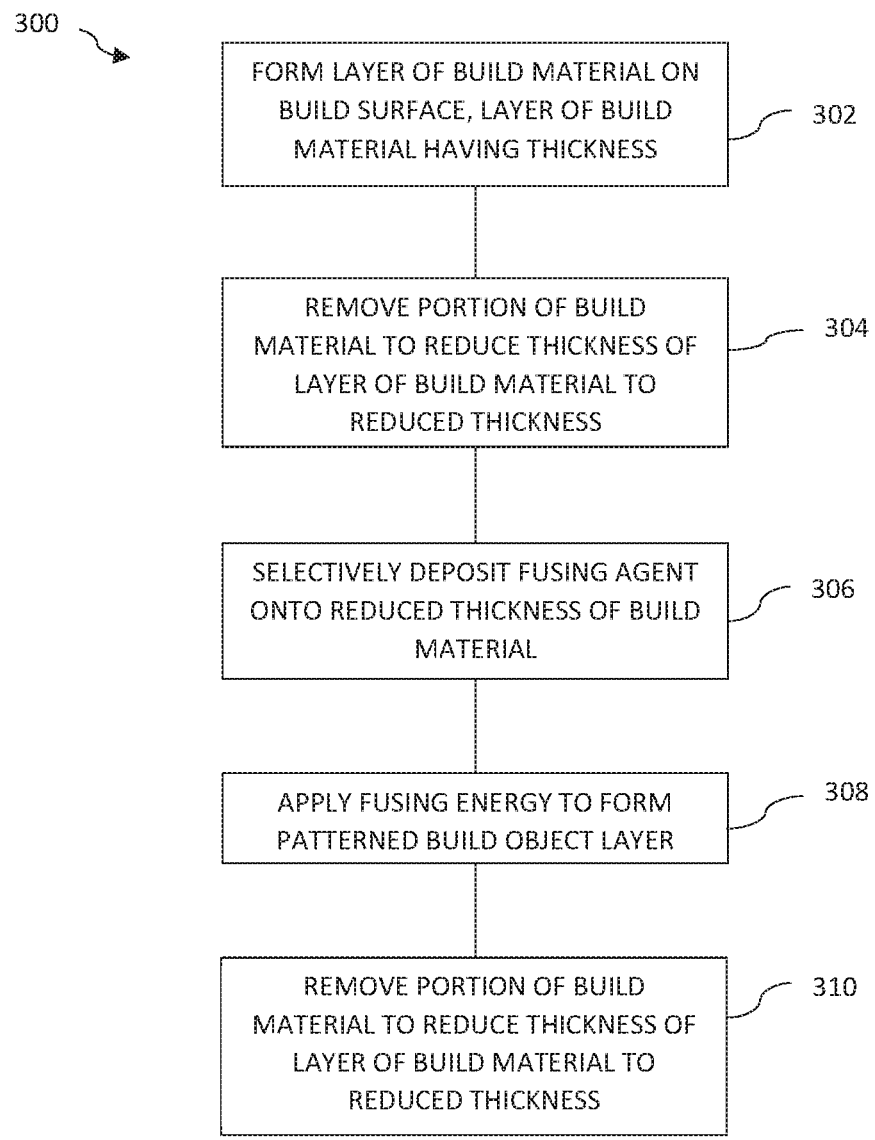
FIG. 4 is a flow chart of another example method of operating an additive manufacturing machine in accordance with aspects of the present disclosure.

FIG. 4 is a flow chart of another example method 300 of operating an additive manufacturing machine in accordance with aspects of the present disclosure. At 302, a layer of a build material is formed on a build surface, the layer of the build material having a first thickness. At 304, a portion of the build material is removed to reduce the thickness of the layer of the build material to a reduced thickness. At 306, a fusing agent is selectively deposited onto the reduced thickness of the build material. At 308, fusing energy is applied to form a patterned build object layer. At 310, a second layer of the build material is deposited onto the build object layer, the second layer of the build material having the thickness.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of operating an additive manufacturing machine, the method comprising:
   translating a spread mechanism in a first direction across a build surface to spread a build material into a layer having a first thickness;
   translating the spread mechanism in a second direction opposite the first direction over the build surface after decreasing a distance between the spread mechanism and the build surface so as to reduce the thickness of the layer from the first thickness to a second thickness; and
   forming an object layer of a build object from the layer of build material having the second thickness,
   wherein the first thickness is selected to reduce shear stress forces applied by the spread mechanism to the build surface and/or build parts beneath the layer by dispersing the stress forces throughout the first thickness of the layer, and is selected to disperse heat energy from the build surface and/or build parts to the build material being spread.

2. The method of claim 1, wherein spreading the build material into the layer having the first thickness includes:
   positioning the spread mechanism at a second distance above the build surface, wherein the second distance is greater than the decreased distance; and
   translating the spread mechanism in the first direction.

3. The method of claim 1, wherein the second thickness is approximately half of the first thickness.

4. The method of claim 1, wherein the translating the spread mechanism in the second direction reduces the thickness of the layer by removing a portion of the build material in a top portion of the layer.

5. The method of claim 1, wherein the spread mechanism comprises a roller mechanism.

6. The method of claim 1, wherein decreasing the distance between the spread mechanism and the build surface includes lowering the spread mechanism.

7. The method of claim 1, comprising forming the object layer by:
   dispensing a fusing agent on the layer of build material having the second thickness;
   selectively fusing the build material at regions thereof where the fusing agent is dispensed; and
   forming the build object layer at regions of the build material where the selective fusing is performed.

8. The method of claim 1, further comprising:
   forming the object layer by selectively depositing a fusing agent onto the layer of build material having the second thickness and applying fusing energy to form the build object layer as a patterned build object layer; and
   depositing a second layer of the build material onto the patterned build object layer, the second layer of the build material having the first thickness.

9. The method of claim 1,
   wherein decreasing the distance between the spread mechanism and the build surface includes raising the build surface.

10. The method of claim 1, wherein reducing the thickness of the layer of build material includes translating a scraping mechanism across a top portion of the layer of build material.

11. The method of claim 1, wherein reducing the thickness of the layer of build material includes scraping a top portion of the build material from the layer.

* * * * *